United States Patent
Kamboj et al.

(10) Patent No.: US 12,346,133 B2
(45) Date of Patent: Jul. 1, 2025

(54) REMOTE OPERATIONS USING IMMERSIVE TELEPRESENCE

(71) Applicant: Schlumberger Technology Corporation, Sugar Land, TX (US)

(72) Inventors: Vineet Kamboj, Menlo Park, CA (US); Bernard Van Haecke, Mountain View, CA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 18/535,184

(22) Filed: Dec. 11, 2023

(65) Prior Publication Data
US 2024/0192697 A1    Jun. 13, 2024

Related U.S. Application Data (60) Provisional application No. 63/386,935, filed on Dec. 12, 2022.

(51) Int. Cl.
| | | |
|---|---|---|
| *G05D 1/224* | (2024.01) | |
| *G05D 1/69* | (2024.01) | |
| *G05D 107/70* | (2024.01) | |
| *G05D 111/10* | (2024.01) | |

(52) U.S. Cl.
CPC .......... *G05D 1/2245* (2024.01); *G05D 1/69* (2024.01); *G05D 2107/70* (2024.01); *G05D 2111/10* (2024.01)

(58) Field of Classification Search
CPC .... G05D 1/2245; G05D 1/69; G05D 2107/70; G05D 2111/10; G05D 1/6987; G05D 2105/89; G05D 2107/90
See application file for complete search history.

(56) References Cited

U.S. PATENT DOCUMENTS

| | | | | |
|---|---|---|---|---|
| 9,940,751 | B1* | 4/2018 | Wagner | G06T 3/40 |
| 12,106,501 | B2* | 10/2024 | Nims | G06T 7/521 |
| 2021/0263515 | A1* | 8/2021 | Henry | G05D 1/0088 |
| 2023/0142394 | A1* | 5/2023 | Henry | G05D 1/229 |
| | | | | 382/103 |
| 2023/0334721 | A1* | 10/2023 | Mene | G06T 11/00 |
| 2024/0370024 | A1* | 11/2024 | Böckem | G05D 1/622 |

OTHER PUBLICATIONS

R. A. Clark, G. Punzo, G. Dobie, C. N. Macleod, R. Summan, G. Pierce, M. Macdonald, G. Bolton; 3D model generation using an airborne swarm. AIP Conf. Proc. Mar. 31, 2015; 1650 (1): 1460-1467. https://doi.org/10.1063/1.4914763 (Year: 2015).*

* cited by examiner

*Primary Examiner* — Thomas Ingram
(74) *Attorney, Agent, or Firm* — Jeffrey D. Frantz (57) ABSTRACT

A method computer system and computer program product are provided for performing remote operations by enhanced telepresence. A set of physical robots in a three-dimensional (3D) space in which is contained a physical object. The set of physical robots includes cameras separated by one or more distances between the cameras. Using at least two of the cameras, images are captured, and a parallax measurement is generated. A 3D virtual reality environment is generated that includes a space representation of the 3D space and an object virtual representation of the physical object. The robot virtual representation includes a point-of-view located about on the set of physical robots. The 3D virtual reality environment is projected using a virtual reality projector.

20 Claims, 7 Drawing Sheets

REMOTE OPERATIONS USING IMMERSIVE TELEPRESENCE

CROSS-REFERENCE TO RELATED APPLICATIONS

This application claims priority from and the benefit of U.S. Provisional Application Ser. No. 63/386,935, filed Dec. 12, 2022.

BACKGROUND

A virtual reality (also referred to as VR) system is a combination of software, computer hardware, and one or more display interfaces that, operating together, may provide a user with an immersive feel of a three-dimensional (3D) virtual world. The one or more display interfaces may include one or more of headsets, goggles, multi-projected environments, gloves, body suits, and other types of interfaces to transmit stimuli to a user. The stimuli may include one or more of visual, audio, haptic, or olfactory stimuli. Thus, a virtual reality system may simulate the user's physical presence in the virtual environment. For example, a virtual reality system may enable a user to move in the virtual world, and view and interact with virtual features or items.

BRIEF DESCRIPTION OF DRAWINGS

FIG. 7.1 and FIG. 7.2 show a computing system and network environment, in accordance with one or more embodiments.

SUMMARY

According to aspects of the invention, a method computer system, and computer program product are provided for performing remote operations by enhanced telepresence. A set of physical robots in a three-dimensional (3D) space in which is contained a physical object. The set of physical robots includes cameras separated by one or more distances between the cameras. Using at least two of the cameras, images are captured, and a parallax measurement is generated. A 3D virtual reality environment is generated that includes a space representation of the 3D space and an object virtual representation of the physical object. The robot virtual representation includes a point-of-view located about on the set of physical robots. The 3D virtual reality environment is projected using a virtual reality projector.

DETAILED DESCRIPTION

In general, embodiments are directed to improved virtual reality systems. In particular the one or more embodiments allow a user to move and interact in a virtual environment, while the user's movements and actions correspond to real actions taken by a robot moving about in a corresponding real environment (i.e., in the real world).

For example, the one or more embodiments allow a worker to conduct equipment inspections remotely by performing three-dimensional (3D) scans using multiple cameras mounted on one or more remotely controlled robots or other mobile platforms. The 3D scans may be performed in real time and may be sufficiently detailed for user to spot anomalies remotely, which otherwise would be visually identifiable when on site.

The user may be able to steer the robot in multiple directions in order to move the robot within a real location and/or around real equipment. In turn, the virtual environment updates in real time as the robot moves and takes actions, and as the environment changes. Thus, the one or more embodiments provide for a comprehensive view of the real environment, as projected in real time in the 3D virtual reality environment.

As used herein, the term "real time," has one of two meanings when applied to updating a virtual reality environment. In a first meaning, the term "real time" means that updates to the virtual reality environment are processed at sufficient speed that a user is unable to perceive the lag time between changes to the real environment and changes to the virtual reality environment. In a second meaning, the term "real time" means that updates to the virtual reality environment are sufficiently fast that, even if the lag time is perceived by a user, the updates take place within a quantified time period that is pre-defined by the user to be acceptable for a given application.

Figure 1:
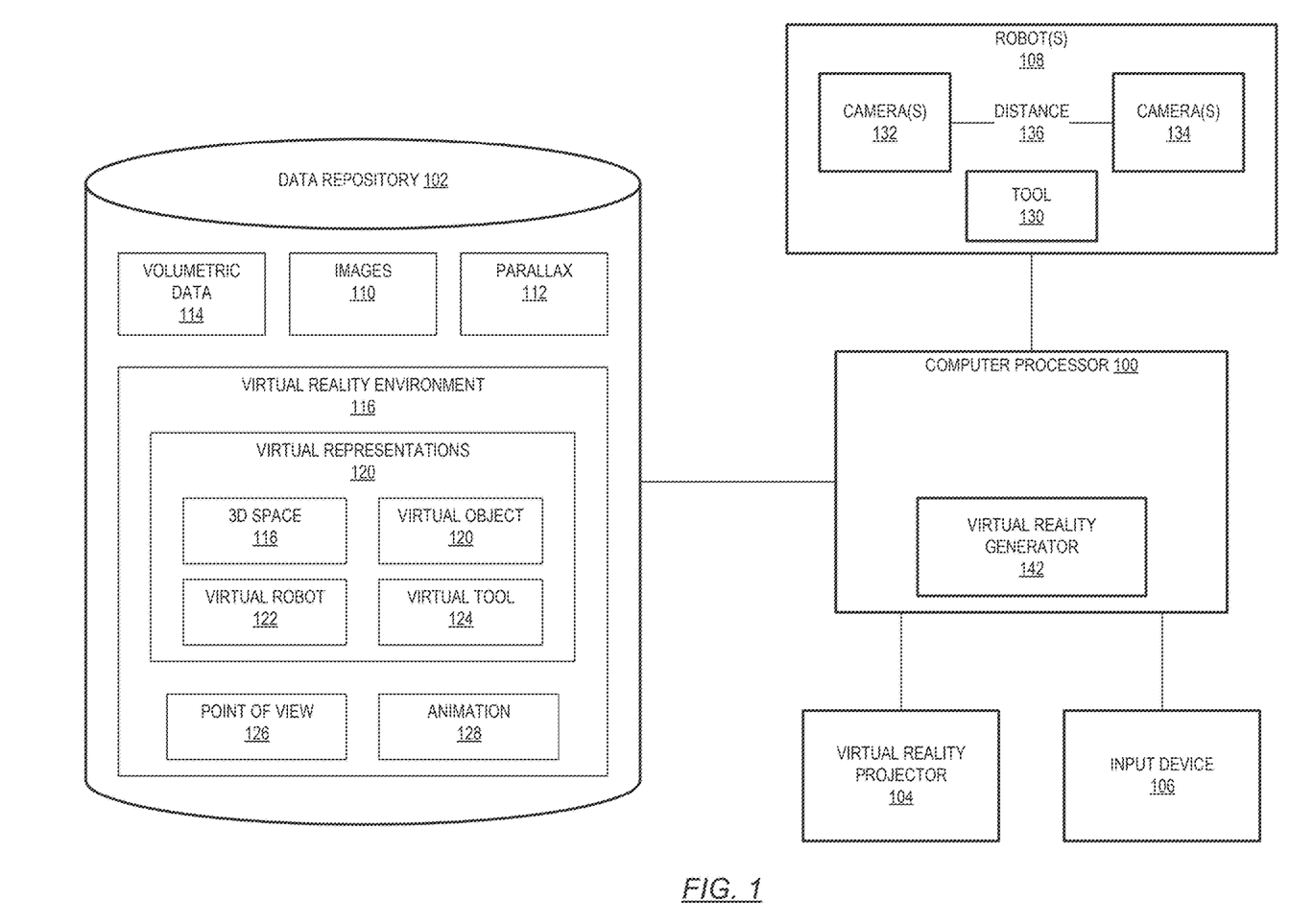
FIG. 1 shows a virtual reality system, in accordance with one or more embodiments.

Attention is now turned to the figures. FIG. 1 shows a virtual reality system, in accordance with one or more embodiments. The virtual reality system includes a computer processor (100), a data repository (102), a virtual reality projector (104), a user input device (106), and a physical robot(s) (108). Each component is described in further detail below. Use of the virtual reality system shown in FIG. 1 is described with respect to FIG. 2.

The computer processor (100) is one or more hardware or virtual processors possibly operating in a distributed computing environment. The computer processor (100) thus is not limited to a single computer processor or to a single computing system. In a specific example, the computer processor (100) may be multiple laptop, desktop, server, and tablet computers operating in tandem or in sequence. However, the computer processor (100) may be a single computer having a single processor in some embodiments.

Figure 71:
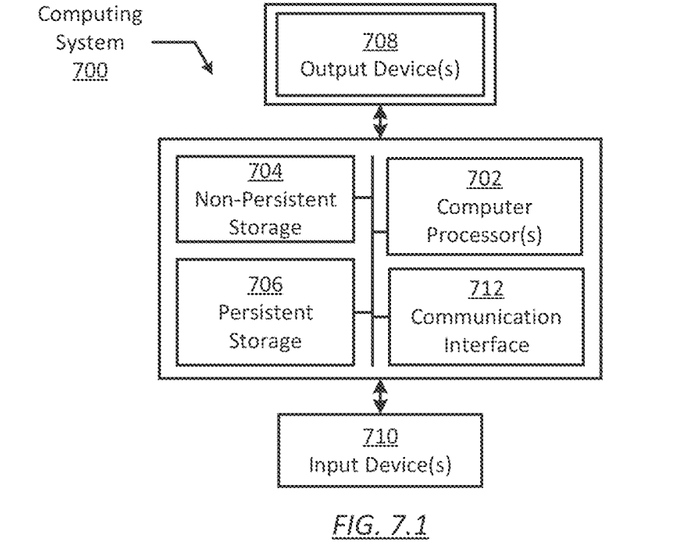
Figure 72:
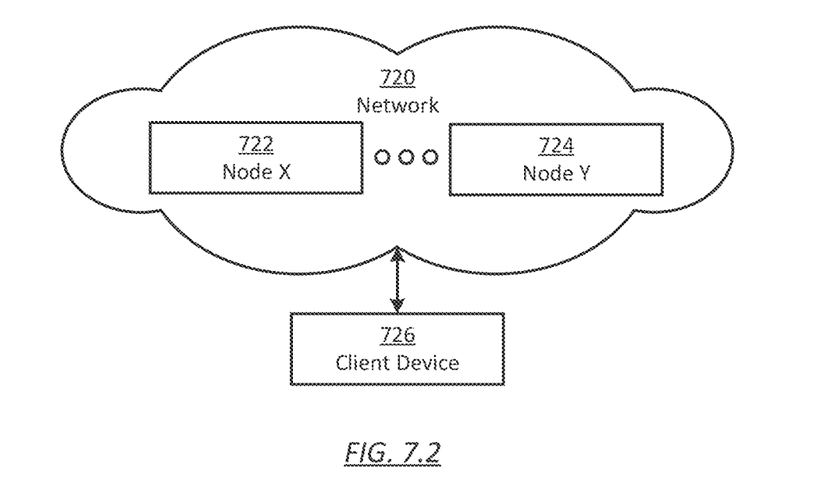

The computer processor (100) executes one or more computer programs which may be stored in a memory, such as the data repository (102). The memory may also be transient or non-transient memory, as described in FIG. 7.1 and FIG. 7.2.

The data repository (102) is a storage unit and/or device (e.g., a file system, database, data structure, or any other storage mechanism) for storing data. The data repository (102) may include multiple different, potentially heterogeneous, storage units and/or devices. The data repository (102) may be characterized as a non-transitory computer readable storage medium. The data repository (102) stores information used by the virtual reality system shown in FIG. 1.

For example, the data repository (102) includes images (110). The images (110) include two or more images captured by two or more cameras. At least two of the images (110) are taken by different cameras in order to establish a parallax measurement (112), defined below. The images (110) may be taken by cameras connected to the physical robot(s) (108), as described below. However, the images (110) could include one or more images taken by fixed cameras disposed elsewhere in the real environment in which the physical robot(s) (108) operates. In the one or more embodiments, the images (110) are images of the physical robot(s) (108), the physical environment in which the physical robot(s) (108) operates, one or more real objects contained within the physical environment, or combinations thereof.

The data repository (102) also may store a parallax measurement (112). The parallax measurement (112) is a specific parallax value calculated between a specific set of at least two of the images (110). While one parallax measurement (112) is shown in FIG. 1, the one or more embodiments contemplate that many values of parallax may be determined for many different sets of two or more images.

Thus, for example, a robot may have six cameras arranged logically into pairs. Three sets of parallax values may be determined for each individual image captured by each of the pairs of cameras. Continuing the example, at a first time there may be three parallax values determined, one for a first pair of images captured by a first pair of cameras, one for a second pair of images captured by a second pair of cameras, and one for a third pair of images captured by a third pair of cameras. Then, at a second time, a new set of parallax values may be determined for each of the three sets of cameras. Note that parallax values may also be calculated for sets of three or more images taken by three or more cameras logically arranged into groups. Thus, the parallax measurement (112) shown in FIG. 1 may include an entire table of different parallax values taken for different pairs of images taken by different sets of cameras.

Attention is now turned to defining the term "parallax" and the use of parallax in the one or more embodiments. The term "parallax" is defined as a displacement or difference in the apparent position of an object viewed along two different lines of sight. Thus, a parallax measurement is measured by the angle or semi-angle of inclination between those lines. Due to foreshortening, nearby objects show a larger parallax measurement than farther objects when observed from different positions. Therefore, a measurement of the angle of parallax can be used to determine distances between the observing positions, assuming the observing positions (e.g., the cameras in the one or more embodiments).

The parallax measurement (112) is useful, because the parallax measurement (112) may be used to determine the distance between the cameras that capture the images (110) and an object or feature in the real physical environment. Measuring distance by using the parallax effect is a special case of the principle of triangulation, which states that one can solve for the triangle sides and angles in a network of triangles if, in addition to the angles in the network, the length of at least one side has been measured. Thus, the careful measurement of the length of one baseline (the distance between two selected cameras) can fix the scale of an entire triangulation network. When determining distances using the parallax effect, the triangle is extremely long and narrow, and by measuring both its shortest side (the motion of the observer) and the small top angle (for example less than 1 arcsecond, leaving the other two close to 90 degrees), the length of the long sides (in practice considered to be equal) can be determined.

The parallax measurement (112) thus permits the determination of depth in a 3D environment. The distances to many objects may be determined using the parallax measurement (112), and accordingly, the relative 3D location of each object or feature in the real environment may be modeled. The objects and features in the 3D environment then may be rendered in a virtual environment, adjusting the size of each object or feature in the virtual reality environment to correspond to the parallax measurement that a user would have perceived had the user been in the real environment. Thus, when the user observes the stimuli presented by the virtual reality projector (104), the user will perceive the virtual reality environment at the same or similar scale as the real environment in which the physical robot(s) (108) is located.

Together, the distances determined using the parallax measurement (112) may be used as, or converted into, volumetric data (114). The volumetric data (114) defines the distances between the various objects and features in the real environment, as well as the real environment itself. Thus, the volumetric data (114) defines the 3D volume in which the physical robot(s) (108) is located, as well as the features and objects within that volume. The 3D volume is the physical area in which the physical robot(s) is located. The volumetric data (114) can then be used to adjust the apparent size of objects and features in the virtual reality environment, as described above.

While the one or more embodiments contemplate the use of the parallax measurement (112) to determine the volumetric data (114), other techniques may also be used. For example, one or more lasers, light emitting diodes (LEDs), or other light projectors may project light into the real environment. Time of flight measurement devices may then be used to determine the time expired between when light leaves the light source and when light reflected from various objects and features within the real environment reaches one or more receiving cameras. Knowing the speed of light (186,000 miles per second), it is then possible to determine the distances from the light source to the features or objects in the real environment. The volumetric data (114) may then be determined from the resulting determined distances.

The data repository (102) also may store data that defines a 3D virtual reality environment (116) when a virtual reality program is executed and takes such data as input. The 3D virtual reality environment (116) is, from the user's perspective, the virtual world or environment that is programmed to reflect the real environment in which the physical robot(s) (108) is located. However, more properly, the 3D virtual reality environment (116) is the data and programming that enables the projection of the virtual world or environment via the virtual reality projector (104), described below.

The 3D virtual reality environment (116) may be subdivided into different aspects. Each aspect is a portion of the overall 3D virtual reality environment (116). For example, the 3D virtual reality environment (116) may include a space representation (118) of the 3D virtual reality environment (116). The space representation (118) is the data that defines the virtual space in which the 3D virtual reality environment (116) is defined. Thus, from the user's perspective, the space representation (118) may be the walls, ceiling, sky, floor, ground, openings, windows, doors, etc. that define the limits of the space in which the 3D virtual reality environment (116) is set.

The 3D virtual reality environment (116) also may include an object virtual representation (120). The object virtual representation (120) is the data that defines one or more virtual objects present in the 3D virtual reality environment (116). Thus, from the user's perspective, the object virtual representation (120) may be the tools, rocks, avatars of virtual people, etc. defined within the space representation (118). In an embodiment, the object virtual representation (120) may be further subdivided into different data definitions or structures for types of objects, individual objects, or other subdivisions of data.

The 3D virtual reality environment (116) also may include a robot virtual representation (122). The robot virtual representation (122) is the data that defines the virtual representation of the physical robot(s) (108), or virtual representations of parts of the physical robot(s) (108), present in the 3D virtual reality environment (116). Thus, from the user's perspective, the robot virtual representation (122) may be a virtual robot as a whole, one or more virtual representations of robotic arms, a robotic propulsion system, or robotic body of the physical robot(s) (108), or may be one or more instrument panels useful for controlling the physical robot(s) (108) in the real environment.

The 3D virtual reality environment (116) also may include a tool virtual representation (124). The tool virtual representation (124) is the data that defines the virtual representation of a tool (130) of the physical robot(s) (108). Thus, from the user's perspective, the virtual representation of the tool (130) may be one or more virtual tools of the robot virtual representation (122). However, in other embodiments, the tool virtual representation (124) also may be one or more objects in the 3D virtual reality environment (116), and thus the tool virtual representation (124) may be an instance of the object virtual representation (120) in some cases. As a specific example, the tool virtual representation (124) may be a tool of the robot virtual representation (122) (e.g., a virtual robotic arm), or may be a tool (e.g. a virtual wrench) which the robot virtual representation (122) may grasp.

The 3D virtual reality environment (116) also includes a point of view (126). The point of view (126) is data that defines the perspective from which the user will observe the 3D virtual reality environment (116) when projected by the virtual reality projector (104). For example, the 3D virtual reality environment (116) may be a first-person point of view. The first-person point of view places the perspective of the user as being the perspective of the robot virtual representation (122) or the tool virtual representation (124). The point of view (126) also may be a perspective view, such as a point on or near the robot virtual representation (122) or the tool virtual representation (124). The point of view (126) also may be defined for some other object in the object virtual representation (120) or defined with respect to the space representation (118) itself. In an embodiment, the point of view (126) may change from time to time, either automatically or at the request of the user.

While the one or more embodiments contemplate that the 3D virtual reality environment (116), including the subdivisions thereof, correspond to real objects in the real environment being modeled, additional virtual representations may be added. For example, as indicated above, a virtual instrument panel may be superimposed over a part of the robot virtual representation (122) in order to provide a user with a user interface projected by the virtual reality projector (104). In another example, instructions may be projected onto one or more portions of the 3D virtual reality environment (116), such as hovering over the tool virtual representation (124) when the corresponding real tool of the physical robot(s) (108) is about to be used. The instructions may guide the user in how the virtual tool may be manipulated. When the user manipulates the tool virtual representation (124), then computer program instructions may cause the real tool of the physical robot(s) (108) to perform corresponding actions on the real object represented by the tool virtual representation (124).

In another example, the 3D virtual reality environment (116) may include an animation (128). The animation (128) may be a series of images projected by the virtual reality projector (104) that indicates or demonstrates a series of actions to be taken by the user, such as with the tool virtual representation (124) or by the robot virtual representation (122). For example, the animation (128) may show a translucent or semi-transparent version of the robot virtual representation (122) moving within the space representation (118) to the location of the object virtual representation (120), and then using the tool virtual representation (124) to drill at a particular location within the space representation (118). Many other examples are possible.

As indicated above, the 3D virtual reality environment (116) may be projected to a user via the virtual reality projector (104). The virtual reality projector (104) is one or more devices useful for presenting, displaying, or otherwise conveying the 3D virtual reality environment (116). Examples of the virtual reality projector (104) may include one or more of goggles, a helmet, a holographic projector, a heads-up display (HUD), or other device which may present to either a 3D image or a two-dimensional image that is rendered in a manner to simulate a 3D image. For example, a two-dimensional image may use forced perspective (i.e., changing the sizes of virtual two-dimensional objects or features) to convey the illusion of a 3D image.

The user may interact with the 3D virtual reality environment (116) via the user input device (106). The user input device (106) is one or more devices useful for receiving input from the user during a virtual reality session. For example, the user input device (106) may include one or more of a keyboard, a mouse, a glove, an eye movement tracker, a joystick, a wheel, or many other devices.

In an embodiment, the user input device (106) may be a virtual representation of a real device. In this case, the user input device (106) may be one of the object virtual representations (120), such as a virtual keyboard projected in the 3D virtual reality environment (116). The user may interact with the object virtual representation (120) (e.g. the virtual keyboard in the 3D virtual reality environment (116), and the computer processor (100) causes the 3D virtual reality environment (116), the physical robot(s) (108), or some other aspect of the system to respond accordingly.

The system shown in FIG. 1 also may include the physical robot(s) (108). However, in some embodiments, the system does not include the physical robot(s) (108) but rather accesses a third-party robot. In any case, the physical robot(s) (108) is a robotic device (e.g., an arm, a claw, a drill, an android-like device, a robotic animal, etc.) which may be static or mobile. The physical robot(s) (108) may include a propulsion system, such as wheels, tracks, legs, etc. plus the actuators and/or motors used to drive the propulsion system.

The physical robot(s) (108) may, in some cases, include the tool (130). The tool (130) may be a tool suitable for performing the task for which the robot is designed. For example, the tool (130) may be a drill, a hammer, a screwdriver, a wrench, a drill bit for drilling into the earth, or a complex device such as a conveyor belt, a pump system, a laser, etc.

The physical robot(s) (108) includes at least two cameras, including camera(s) (132) and camera(s) (134). Each camera(s) may be used to capture one or more of the images (110) described above. In a specific example, the camera(s) (132) and the camera(s) (134) may be attached to the housing that forms the superstructure of the physical robot(s) (108) by mounted to different sections of the physical robot(s) (108) that are separated by a distance (136). In another specific example, the camera(s) (132) and the camera(s) (134) may be attached to different physical robot(s) (108), Each camera may be used to capture one or more of the images (110) described above. Because the cameras are separated by at least the distance (136), the parallax measurement (112) described above may be determined for a remote real object, as described above.

The physical robot(s) (108) may include many different parts. The physical robot(s) (108) also may include more or fewer cameras than those shown in FIG. 1. The cameras may be arranged in pairs, with a distinct distance (e.g. the distance (136)) being defined between each of the cameras.

The system shown in FIG. 1 also may include a virtual reality generator (142). The virtual reality generator (142) is software and/or application specific hardware which, when executed by or called by the computer processor (100), performs a computer-implemented method, such as the method described with respect to FIG. 2. Thus, for example, the virtual reality generator (142) may be used to generate the 3D virtual reality environment (116) and the various subdivisions within the 3D virtual reality environment (116), as described above.

While FIG. 1 shows a configuration of components, other configurations may be used without departing from the scope of the one or more embodiments. For example, various components may be combined to create a single component. As another example, the functionality performed by a single component may be performed by two or more components.

Figure 2:
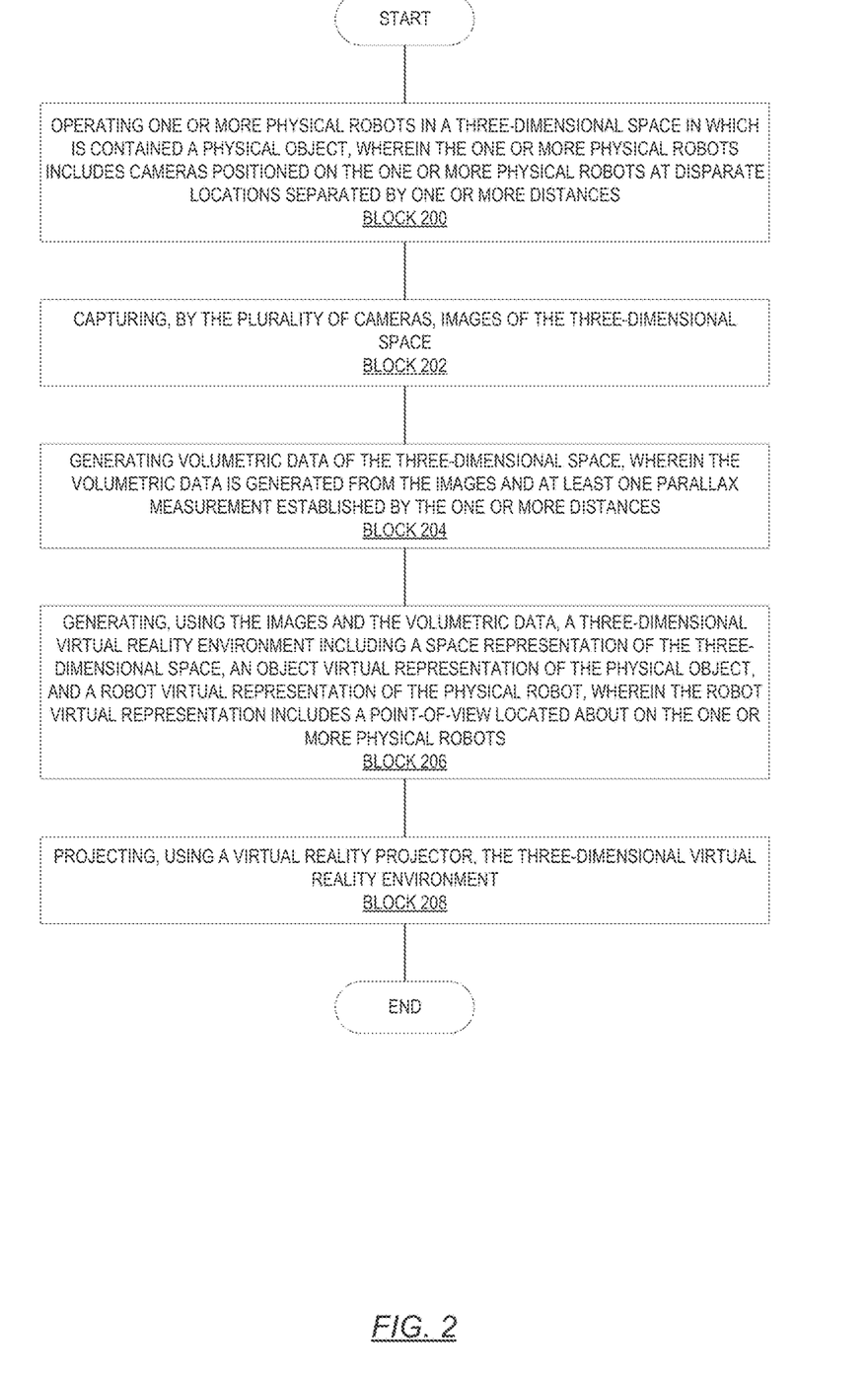
FIG. 2 shows a virtual reality method, in accordance with one or more embodiments.

FIG. 2 shows a virtual reality method, in accordance with one or more embodiments. The method of FIG. 2 may be executed using the system shown in FIG. 1, possibly using one or more of the computer and/or network shown in FIG. 7.1 and FIG. 7.2.

Block 200 includes operating a physical robot in a 3D space containing a physical object. Thus, the 3D space is a real environment. The physical robot includes cameras located on different parts of the physical robot. The different parts are separated by one or more distances between the cameras. The robot may be operated remotely via wired or wireless communications.

Block 202 includes capturing, using at least two of the cameras, a number of images of the 3D space. The images may be captured either automatically or upon user command. The images may be captured continuously or at regular intervals so that the corresponding virtual reality environment, described below, may be updated.

Block 204 includes generating, using the at least two of the cameras and at least one parallax measurement established by the one or more distances, volumetric data of the 3D space. Specifically, if the length of one baseline of a triangle (i.e., the known distance between the cameras) is known, then the length of the sides of a triangle formed by lines drawn from the cameras to the object in question may be determined. Stated differently, when using the parallax effect, the triangle is extremely long and narrow, and by measuring both its shortest side (the motion of the observer) and the small top angle, the length of the long sides of the triangle can be determined.

Block 206 includes generating, using the images and the volumetric data, a 3D virtual reality environment including a space representation of the 3D space, an object virtual representation of the physical object, and a robot virtual representation of the physical robot. The robot virtual representation may be a point-of-view located about on the physical robot. For example, the robot virtual representation may show at least some of the robot to the user in the virtual reality environment, possibly, the user may not see the robot but perceive virtual objects from the same perspective as the robot.

Block 208 includes projecting, using a virtual reality projector, the 3D virtual reality environment. Projecting may be performed by displaying a 3D image, or by displaying a two-dimensional image using forced perspectives to convey to the user the perception of a 3D image. Projecting may be performed using one or more different display devices. In addition to visual stimuli, projecting also may include auditory, haptic, or olfactory perceptions to a user.

The method of FIG. 2 may be varied. For example, the method also may include moving the physical robot in the 3D space to an updated position. Then, the images and the volumetric data are updated using an updated set of images and updated volumetric data. Then, the method also includes generating an updated 3D virtual reality environment using the updated images and the updated volumetric data.

In yet another embodiment, the method may include projecting, using the virtual reality projector, an animation of a changing perspective, within the virtual reality environment from the point-of-view, of the robot virtual representation as the physical robot moves to the updated position. In other words, the user perceives that the user is moving in space towards a new position within the virtual reality environment.

In still another embodiment, the robot also includes a tool. In this case, the method also includes receiving a command from a user input device operated by a user. For example, the user may manipulate a glove, a keyboard, a joystick, or other user device, or possibly direct an eye movement to trigger an eye movement detection system. Then the method also includes operating, based on the command, the tool of the physical robot in the 3D space to manipulate the physical object. The method then also includes projecting, using the virtual reality projector, a first virtual representation of a use of the tool and a second virtual representation of a change to the physical object.

In another embodiment the method also includes projecting, using the virtual reality projector, a virtual manipulation of the object virtual representation. The method then includes projecting, using the virtual reality projector, a set of instructions for performing the virtual manipulation using a virtual tool of the robot virtual representation. In this manner, a user may be provided, in the virtual reality environment, with instructions regarding how to perform a procedure in the real environment. The user performs the instructions using virtual representations of the robot, the tool(s), and the object(s). In turn, the physical robot and physical tool performs the commanded actions on the real physical object.

Thereafter, the method may include updating the images and updating the volumetric data using updated images and updated volumetric data. For example, the cameras may continue to capture images as the robot operates. Then, an updated 3D virtual reality environment is generated using the updated images and the updated volumetric data. Then the method includes projecting, using the virtual reality projector, an animation of the object virtual representation and the virtual tool, within the virtual reality environment from the point-of-view. The animation corresponds to real physical movements of the tool and of the object. Thus, a user may initiate, perform, and monitor a real-time, in-situ physical procedure being performed at a remote location, through the virtual reality environment.

While the various blocks in this flowchart are presented and described sequentially, at least some of the blocks may be executed in different orders, may be combined or omitted, and at least some of the blocks may be executed in parallel. Furthermore, the blocks may be performed actively or passively.

FIG. 3, FIG. 4, FIG. 5 and FIG. 6 together show an example of remote operations using an immersive telepresence, in accordance with one or more embodiments. The following example is for explanatory purposes and not intended to limit the scope of the one or more embodiments.

Figure 3:
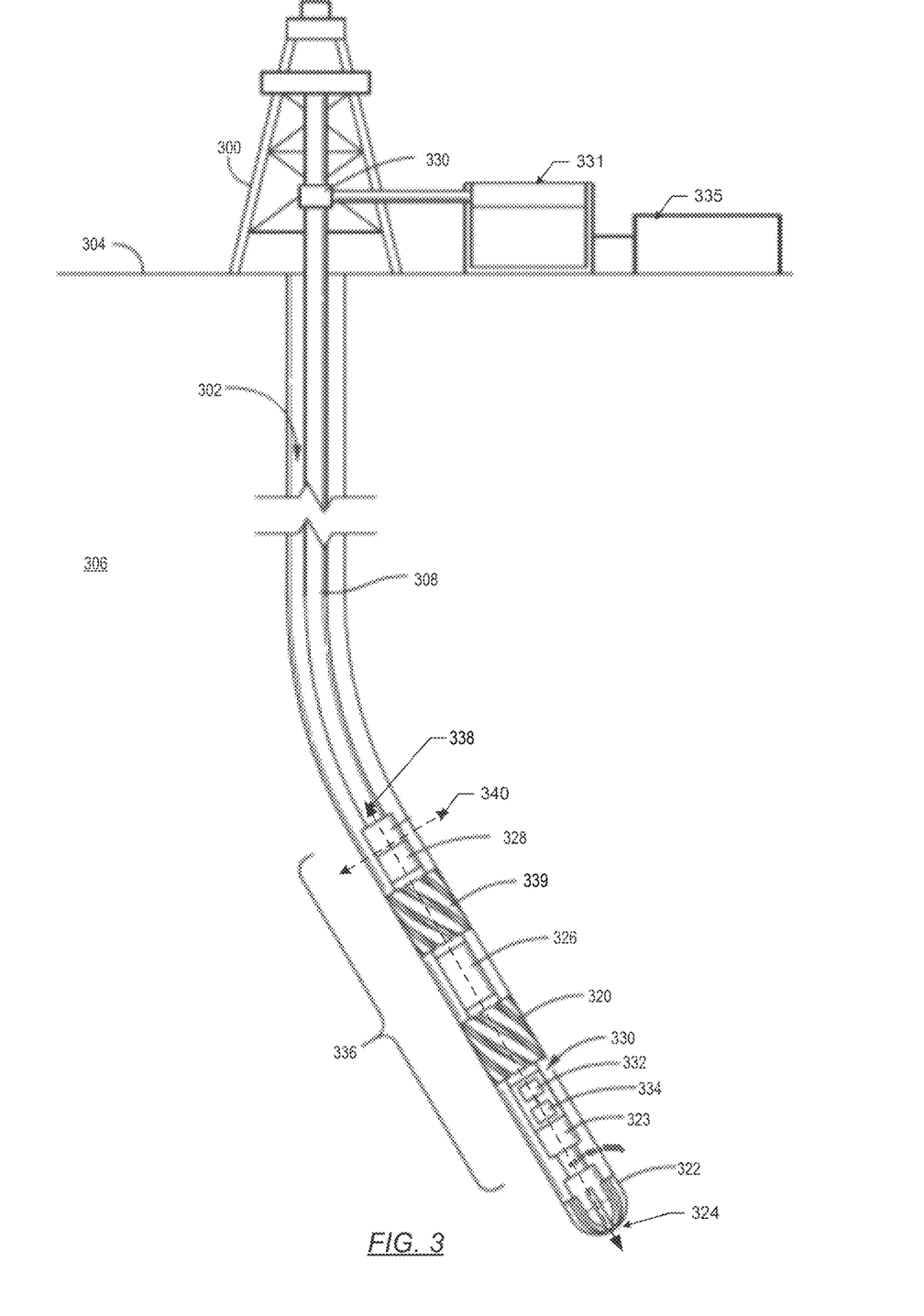
FIG. 3, FIG. 4, FIG. 5, and FIG. 6 together show an example of remote operations using an immersive telepresence, in accordance with one or more embodiments.

FIG. 3 shows a drilling rig (300) drilling a wellbore (302) in a surface (304) of a formation (306) in the Earth using a drill string (308). A control unit (330) may drive the drilling process. Mud stored in a tank (331) may be pumped into the drill string (308) and/or the wellbore (302) in order to facilitate the drilling operation. Workers, computers, and other equipment may be housed in a building (335).

The drill string (308) is a long pipe, which may be segmented, that may include a variety of components used to drill the wellbore (302). Near the end of the drill string (308) is a bottom hole assembly, referred to as a BHA (336). The BHA (336) includes a variety of tools and equipment useful in performing and/or monitoring the drilling operation. For example, the BHA (336) may include a first stabilizer (339) and a second stabilizer (320) used to stabilize the drill string (308). A steering unit (323) may be used to help guide the BHA (336) during a drilling operation.

At the end of the BHA (336) of the drill string (308) is a drill bit (322). The drill bit (322) is used to drill into the bottom (324) of the wellbore (302). During a drilling operation, the drill bit (322) experiences vibrations, which are transferred to the rest of the BHA (336) and other parts of the drill string (308), as described above.

The drill string (308) also includes one or more tools disposed in, on, or otherwise connected to the drill string (308). A tool is a device designed to perform a function during a drilling operation. Many of the tools are placed in the BHA (336).

There are many kinds of tools used in a drilling operation. Examples of tools include Measurement While Drilling (MWD) instruments, such as MWD tool (326) designed to measure the borehole direction. Other tools include Logging While Drilling (LWD) sensors, such as LWD tool (328), designed to measure rock formation properties. Other tools include a control unit (330) that may include a processor (332), and a drilling sensor (334). Still other types of tools are possible, such as a downhole drilling dynamics data recorder or a wellbore monitoring device.

For clarity, a coordinate system is established with respect to describing the one or more embodiments. The term "axial" refers to a distance along, or parallel to, a longitudinal axis (338) of the drill string (308) or the BHA (336). The term "distal" refers to a location on the longitudinal axis (338), or a line parallel to the longitudinal axis (338), that is closer to the end of the drill bit (322) (e.g., closer to the bottom (324) of the wellbore (302) during a drilling operation). The term "proximal" refers to a location on the longitudinal axis (338), or parallel to the longitudinal axis (338), that is closer to the end of the drill string (308) opposite the end having the drill bit (322) (e.g., is closer to the surface (304) than to the end having the drill bit (322). Thus, a proximal location on an item is a location or side closer to the surface (304) than remaining locations on the item that are closer to the drill bit (322).

The term "radial" refers to a distance along, or parallel to, a radial axis (340) that is perpendicular to the longitudinal axis (338). Thus, for example, the term "radial" may refer to a length along a radius or diameter of a drill string (308) that is cylindrical in shape. The term "radially outwardly" refers to a distance that extends from the longitudinal axis (338) towards an edge of the wellbore (302) along a radial line, such as the radial axis (340). The term "radially inwardly" refers to a distance that extends towards the longitudinal axis (338) along a radial line, such as the radial axis (340).

In the example shown in FIG. 3, the BHA (336) is a physical robot. The drill bit (322) is a tool of the physical robot. The BHA has a steering system which the user may manipulate remotely.

In one example, the two or more cameras are placed at either side of the bottom of the BHA (336). The distance between the cameras is known. An object (e.g., a rock or a formation) at the bottom (324) of the wellbore (302), as well as the bottom and parts of the sides of the wellbore (302) may be imaged using the cameras. The images and the parallax measurement established using the cameras, the object, and the bottom and sides of the wellbore (302) may then be used to create a virtual reality environment projected to a user situated in an office or command center in the building (335). The user may then manipulate the drill bit or other tools of the BHA (336) based on the real-time virtual reality environment projected to the user, because the virtual reality environment is a virtual representation of the real physical environment in the wellbore (302).

Figure 4:
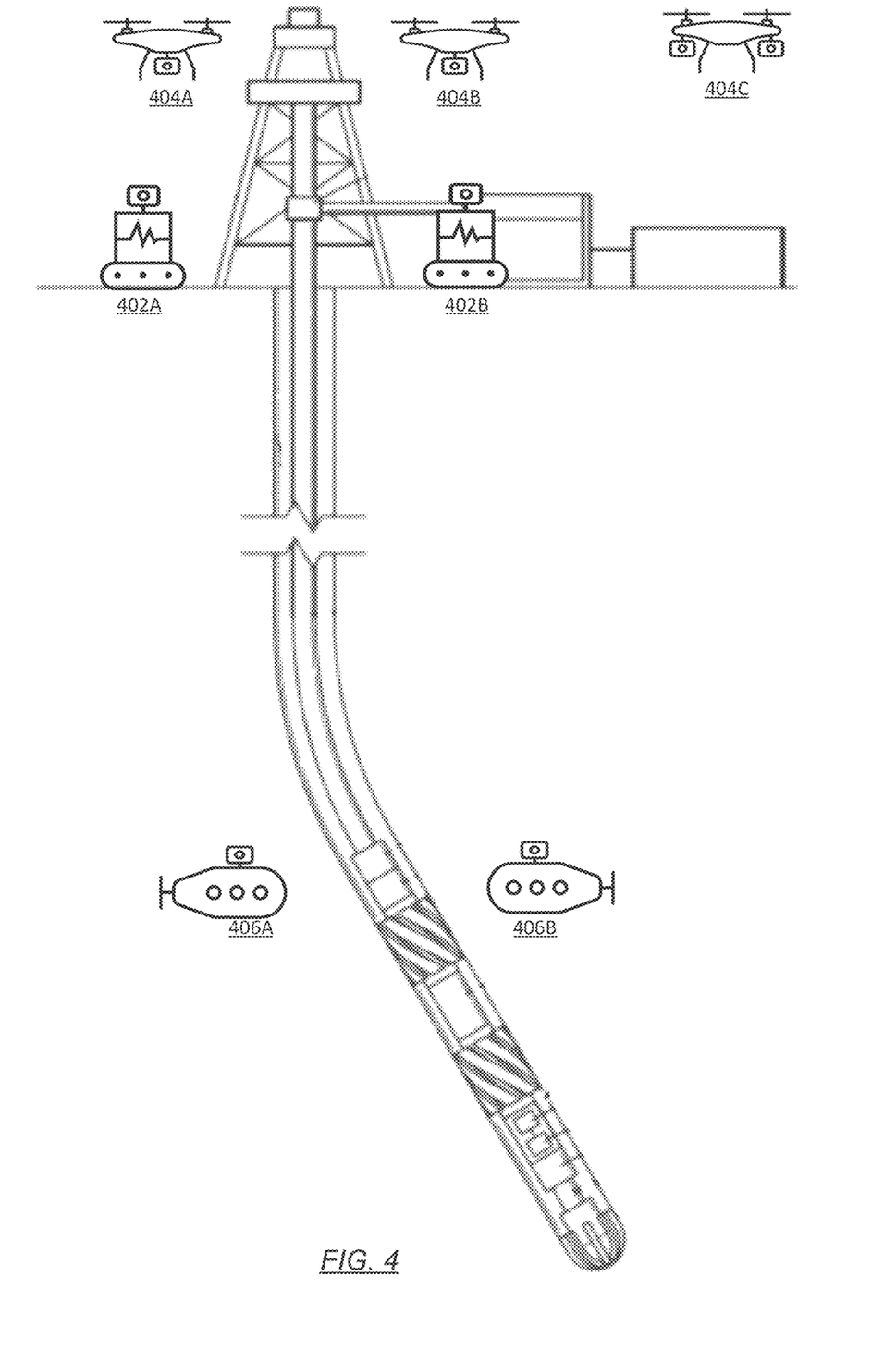

The example illustrated in FIG. 4 leverages multiple robots, organized into a synchronized swarm, to enhance the generation of the 3D environments. The example illustrated in FIG. 4 provides a "Multi-Robot Parallax Augmented Telepresence" (M-RoPAT) that employs a fleet of robots, each equipped with its own set of cameras and sensors.

The M-RoPAT system operates in a real 3D space. Each robot member of the swarm is a robotic unit designed for specific environments, such as surface unit(s) (402A, 402B), aerial unit(s) (404A, 404B, 404C), and submersible (subterranean) units(s) (406A, 406B), depending on the operational context. Each robot in the swarm features camera(s). Each robot in the swarm may be equipped with various sensors, including GPS, inertial measurement units (IMU), cameras, and proximity sensors.

Actions of individual robots within the swarm can be coordinated from a centralized control unit (CCU), that can be housed, for example, in building (335). The CCU communicates with each drone through a secure wireless network sending commands and receiving real-time data from the drones to distribute tasks, optimize routes, and ensure collision avoidance. Sensors mounted on the robots provide data to the CCU, which is used to track the position and orientation of each drone and make informed decisions for mission execution.

The robots may also be equipped with communication devices allowing them to relay information to neighboring drones and the CCU. The robots communicate with each other to maintain formation, while sharing data to enhance situational awareness.

The robots are positioned and synchronized such that the cameras are separated by specific distances enabling the parallax measurement. Images captured from the multiple Cameras are combined (for example using various structure from motion (SFM) algorithms) to render a virtual 3D Representation of the physical object.

Figure 5:
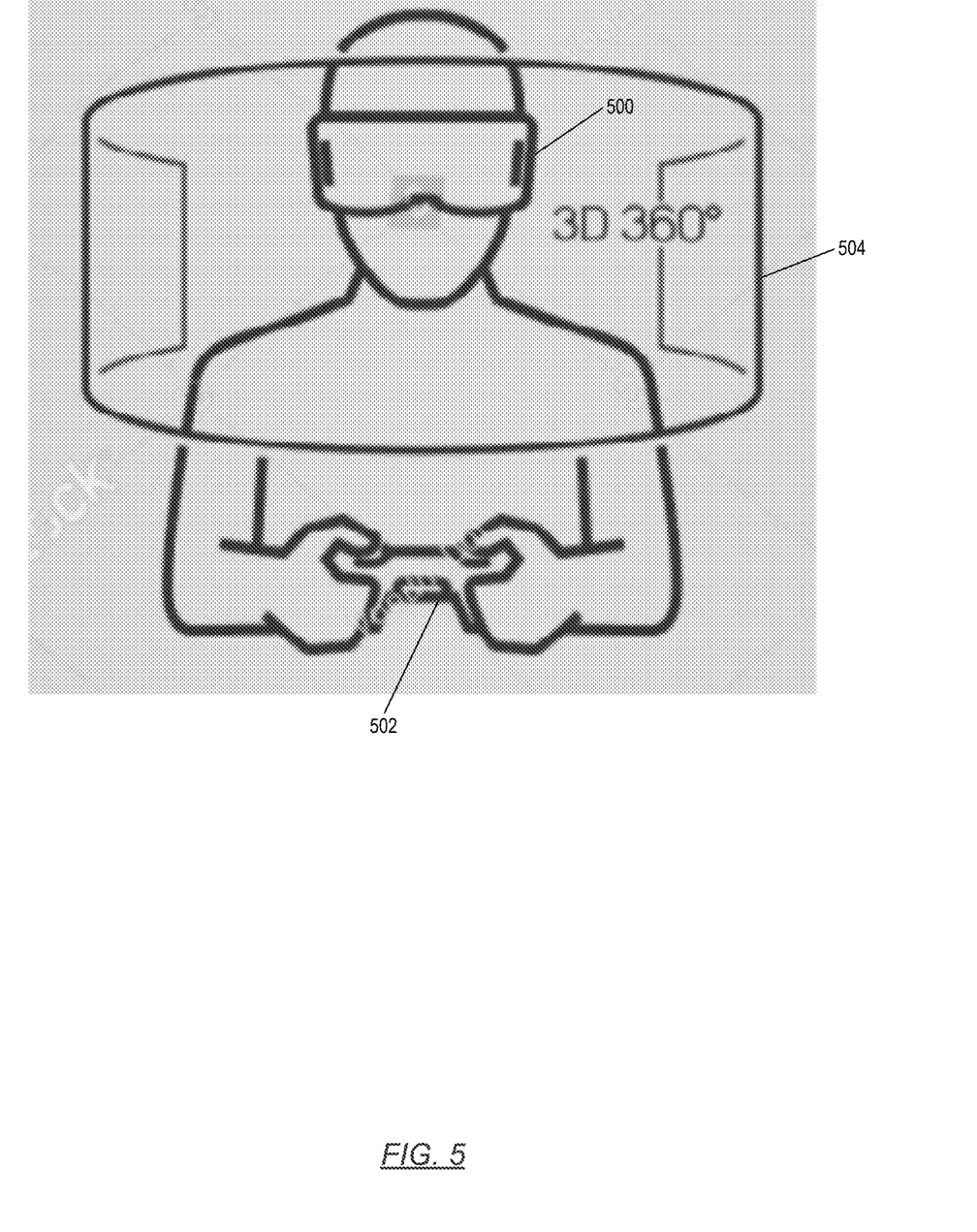

FIG. 5 shows a user using a virtual reality projector (500) in the form of virtual reality goggles. The user manipulates a user input device (502), which in turn, commands a remote physical robot and/or one or more tools of the virtual robot that operate in a real environment. Cameras on the robot capture images which are then used to generate a 3D, 360° virtual reality environment (504) that is visible to the user via the virtual reality projector (500). Thus, the user is able to perceive a virtual representation of the real environment with the virtual representation updating in real time as the robot moves and operates within the real environment.

Figure 6:
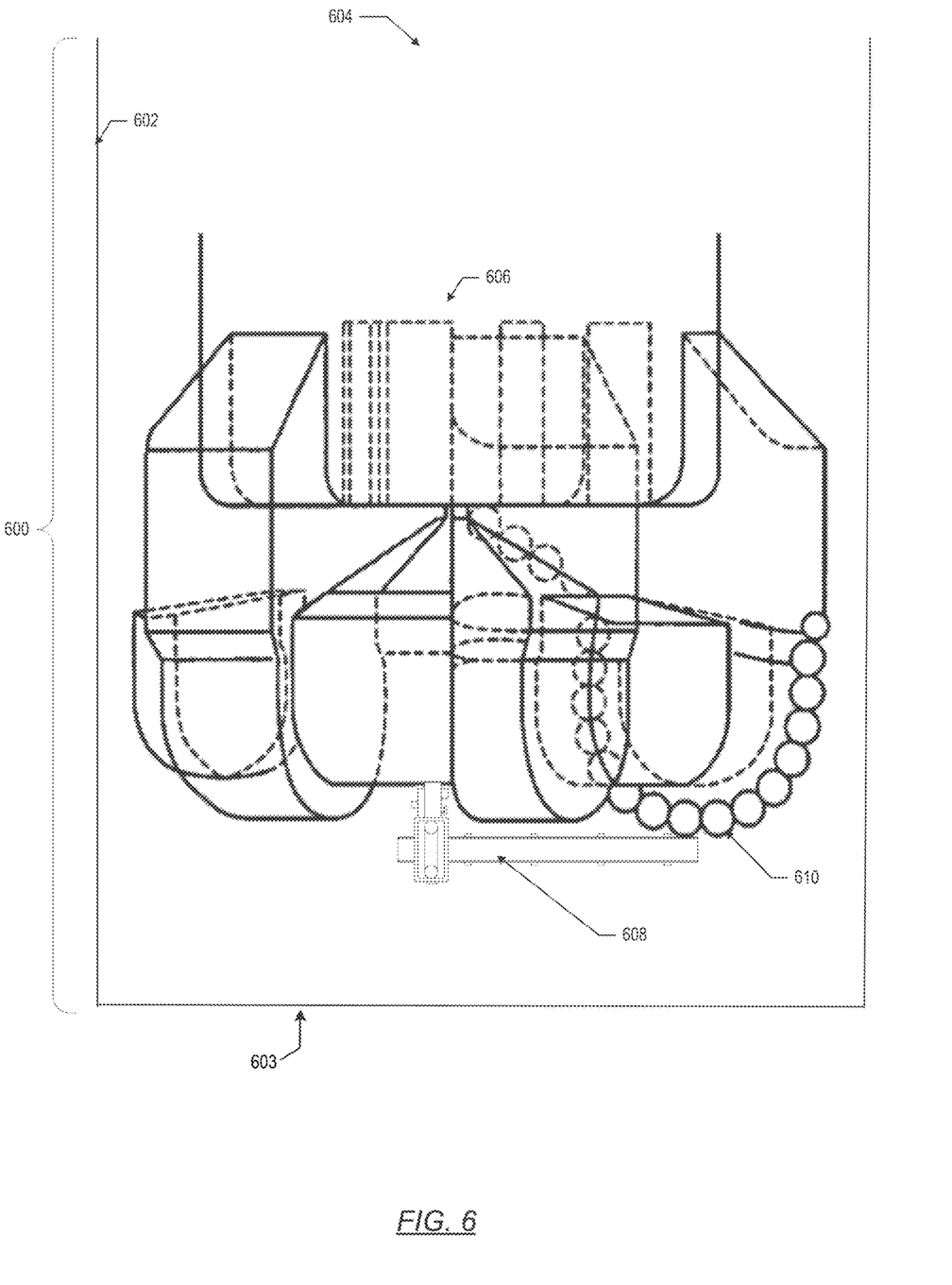

FIG. 6 shows an example of the virtual reality environment (604) shown in FIG. 6, which is generated using captured images of the real environment shown in FIG. 3 and FIG. 4. The user perceives the virtual reality environment (604), for example, using the virtual reality projector (500) also shown in FIG. 5.

As shown in FIG. 6, the virtual reality environment (604) includes a wellbore representation (600), which include a virtual walls (602) of the wellbore representation (600) and a virtual bottom (603) of the wellbore representation (600). The robot virtual representation (606) shows a bottom portion of the BHA (e.g., the drill bit). Because the robot virtual representation (606) is virtual, dashed lines as shown in FIG. 6 may be used to display to the user the inside portions of the robot virtual representation (606).

The virtual reality environment (604) also includes a virtual tool (608) that corresponds to a real tool disposed on or extending from the real physical robot. The real procedure to be performed is to use the real tool to perform maintenance on real drill teeth. In this example, the user manipulates the virtual tool (608) on a virtual object (610) that looks like the real drill teeth. As the user works, the real tool performs the corresponding operations on the real drill teeth. The virtual reality environment (604) is updated in real time as the user works so that the user may stay informed regarding what the real environment would look like had the user been physically present in the corresponding real environment. In this manner, the user may perform accurate remote operations while perceiving detailed 3D images that allow the user to perform complicated physical procedures remotely.

Thus, the one or more embodiments may be used to provide detailed 3D views of equipment or of a space by combining multiple camera sensors, either fixed or mobile. Mobile sensors provide a more comprehensive view of the equipment and the environment. Mobile sensors can be installed on robots suited for the target environment (aerial, underwater, subterranean, etc.) such as drones, wheeled rovers, and the like. The multiple cameras may provide a live 3D reconstruction of a space or object for close-up 3D inspections.

In more advanced scenarios, such robot-based sensors could arrange themselves to detect, reach, and go around specific objects and places autonomously. In addition, the one or more embodiments provide the capability of controlling sensitive equipment remotely from within an immersed view by pushing buttons, turning off valves and chokes, actuating levers, or controlling robotic hands in a real environment.

In addition, captured depth data allows realistic 3D rendering of the environment provides a useful virtual reality experience. Data is transmitted using networking connections from the scanning platform to the nearest network to which an operator is able to connect (for example, a science information network (SINET)). Thus, real time data transfers may be performed.

In the energy industry, such as in oil and gas, exploration, drilling, and production, the ability to provide telepresence access can be beneficial in several ways. For example, the one or more embodiments allow remote workers to inspect and operate equipment from a distant location. Potential benefits in terms of real-time operations and team collaboration can be achieved more safely, in a timelier manner, and at a lower cost than by sending human crews to perform those same operations.

Embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7.1, the computing system (700) may include one or more computer processors (702), non-persistent storage (704), persistent storage (706), a communication interface (712) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) (702) may be one or more cores or micro-cores of a processor. The computer processor(s) (702) includes one or more processors. The one or more processors may include a central processing unit (CPU), a graphics processing unit (GPU), a tensor processing units (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (708). The inputs may include text input, audio input, video input, etc., which may be processed and transmitted by the computing system (700) in accordance with the disclosure. The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output devices (708) may include a display device, a printer, external storage, or any other output device. One or more of the output devices may be the same or different from the input device(s). The input and output device(s) may be locally or remotely connected to the computer processor(s) (702). Many different types of computing systems exist, and the aforementioned input and output device(s) may take other forms. The output devices (708) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7.1. Further, the client device (726) may include and/or perform at least a portion of one or more embodiments.

The computing system of FIG. 7.1 may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and blocks shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein.

What is claimed is:

1. A method comprising:
    operating a set of physical robots in a three-dimensional (3D) space in which is contained a physical object, wherein the set of physical robots comprises a plurality of cameras located on the set of physical robots, and wherein cameras in the plurality of cameras are separated by one or more distances between the plurality of cameras;
    capturing, using at least two of the plurality of cameras, a plurality of images of the 3D space;
    generating, using the at least two of the plurality of cameras and at least one parallax measurement established by the one or more distances, volumetric data of the 3D space;
    generating, using the plurality of images and the volumetric data, a 3D virtual reality environment comprising a space representation of the 3D space, an object virtual representation of the physical object, and a robot virtual representation of the set of physical robots, wherein the robot virtual representation comprises a point-of-view located about on the set of physical robots; and
    projecting, using a virtual reality projector, the 3D virtual reality environment.

2. The method of claim 1, wherein the set of physical robots comprises a plurality of physical robots organized into a swarm.

3. The method of claim 1, further comprising:
    moving the set of physical robots in the 3D space to an updated position;
    updating the plurality of images and updating the volumetric data using an updated plurality of images and an updated volumetric data;
    generating an updated 3D virtual reality environment using the updated plurality of images and the updated volumetric data; and
    projecting, using the virtual reality projector, an animation of a changing perspective, within the 3D virtual reality environment from the point-of-view, of the robot virtual representation as the set of physical robots moves to the updated position.

4. The method of claim 1, wherein the set of physical robots comprises a tool, and wherein the method further comprises:
    receiving a command from a user input device operated by a user;
    operating, based on the command, the tool of the set of physical robots in the 3D space to manipulate the physical object; and
    projecting, using the virtual reality projector, a first virtual representation of a use of the tool and a second virtual representation of a change to the physical object.

5. The method of claim 1, further comprising:
    projecting, using the virtual reality projector, a virtual manipulation of the object virtual representation; and
    projecting, using the virtual reality projector, a set of instructions for performing the virtual manipulation using a virtual tool of the robot virtual representation.

6. The method of claim 5, further comprising:
receiving, from a user input device, a command to manipulate the object virtual representation;
operating, based on the command, a physical tool of the set of physical robots to manipulate the physical object;
updating the plurality of images and updating the volumetric data using an updated plurality of images and an updated volumetric data;
generating an updated 3D virtual reality environment using the updated plurality of images and the updated volumetric data; and
projecting, using the virtual reality projector, an animation of the object virtual representation and the virtual tool, within the 3D virtual reality environment from the point-of-view, wherein the animation corresponds to real physical movements of the physical tool and of the physical object.

7. A system comprising:
a computer processor;
a virtual reality projector in communication with the computer processor;
a set of physical robots comprising a tool and a plurality of cameras located on different parts of the set of physical robots, wherein:
the different parts are separated by one or more distances between the plurality of cameras, and
at least one of the set of physical robots and the tool is in communication with the computer processor;
a user input device in communication with the computer processor; and
a data repository in communication with the computer processor and storing:
a plurality of images of a 3D space in which the set of physical robots is located, wherein the plurality of images are taken using at least two of the plurality of cameras,
a parallax measurement established by the one or more distances,
volumetric data of the 3D space, and
a 3D virtual reality environment comprising a space representation of the 3D space, an object virtual representation of a physical object, and a robot virtual representation of the set of physical robots, wherein the robot virtual representation comprises a point-of-view located about on the set of physical robots.

8. The system of claim 7, wherein the set of physical robots comprises a plurality of physical robots organized into a swarm.

9. The system of claim 7, further comprising:
a virtual reality generator which, when executed by the computer processor, performs a computer-implemented method comprising:
capturing the plurality of images using the at least two of the plurality of cameras;
generating the volumetric data using the at least two of the plurality of cameras and the parallax measurement;
generating the 3D virtual reality environment using the plurality of images and the volumetric data; and
projecting the 3D virtual reality environment using the virtual reality projector.

10. The system of claim 9, wherein the computer-implemented method comprises:
in response to moving the set of physical robots in the 3D space to an updated position, updating the plurality of images and updating the volumetric data using an updated plurality of images and an updated volumetric data;
generating an updated 3D virtual reality environment using the updated plurality of images and the updated volumetric data; and
projecting, using the virtual reality projector, an animation of a changing perspective, within the 3D virtual reality environment from the point-of-view, of the robot virtual representation as the set of physical robots moves to the updated position.

11. The system of claim 9, wherein the computer-implemented method further comprises:
receiving a command from the user input device operated by a user;
operating, based on the command, the tool of the set of physical robots in the 3D space to manipulate the physical object; and
projecting, using the virtual reality projector, a first virtual representation of a use of the tool and a second virtual representation of a change to the physical object.

12. The system of claim 9, wherein the computer-implemented method comprises:
projecting, using the virtual reality projector, a virtual manipulation of the object virtual representation; and
projecting, using the virtual reality projector, a set of instructions for performing the virtual manipulation using a virtual tool of the robot virtual representation.

13. The system of claim 9, wherein the computer-implemented method comprises:
receiving, from the user input device, a command to manipulate the object virtual representation;
operating, based on the command, a physical tool of the set of physical robots to manipulate the physical object;
updating the plurality of images and updating the volumetric data using an updated plurality of images and an updated volumetric data;
generating an updated 3D virtual reality environment using the updated plurality of images and the updated volumetric data; and
projecting, using the virtual reality projector, an animation of the object virtual representation and the virtual tool, within the 3D virtual reality environment from the point-of-view, wherein the animation corresponds to real physical movements of the physical tool and of the physical object.

14. A system comprising:
a computer processor;
a virtual reality projector in communication with the computer processor;
a set of physical robots comprising a tool and a plurality of cameras located on different parts of the set of physical robots, wherein:
the different parts are separated by one or more distances between the plurality of cameras, and
at least one of the set of physical robots and the tool is in communication with the computer processor;
a user input device in communication with the computer processor; and
a non-transitory computer readable storage medium storing program code, which when executed by the computer processor, performs a computer-implemented method comprising:
capturing, using at least two of the plurality of cameras, a plurality of images of a three-dimensional (3D) space;

generating, using the at least two of the plurality of cameras and at least one parallax measurement established by the one or more distances, volumetric data of the 3D space; and generating, using the plurality of images and the volumetric data, a 3D virtual reality environment comprising a space representation of the 3D space, an object virtual representation of a physical object, and a robot virtual representation of the set of physical robots, wherein the robot virtual representation comprises a point-of-view located about on the set of physical robots.

15. The system of claim 14 further comprising the virtual reality projector configured to display the 3D virtual reality environment.

16. The system of claim 14, wherein the set of physical robots comprises a plurality of physical robots organized into a swarm.

17. The system of claim 14, wherein the computer-implemented method further comprises:
moving the set of physical robots in the 3D space to an updated position;
updating the plurality of images and updating the volumetric data using an updated plurality of images and an updated volumetric data;
generating an updated 3D virtual reality environment using the updated plurality of images and the updated volumetric data; and
projecting, using the virtual reality projector, an animation of a changing perspective, within the 3D virtual reality environment from the point-of-view, of the robot virtual representation as the set of physical robots moves to the updated position.

18. The system of claim 14, wherein the computer-implemented method further comprises:
receiving a command from the user input device operated by a user;
operating, based on the command, the tool of the set of physical robots in the 3D space to manipulate the physical object; and
projecting, using the virtual reality projector, a first virtual representation of a use of the tool and a second virtual representation of a change to the physical object.

19. The system of claim 14, wherein the computer-implemented method further comprises:
projecting, using the virtual reality projector, a virtual manipulation of the object virtual representation; and
projecting, using the virtual reality projector, a set of instructions for performing the virtual manipulation using a virtual tool of the robot virtual representation.

20. The system of claim 14, wherein the computer-implemented method further comprises:
receiving, from the user input device, a command to manipulate the object virtual representation;
operating, based on the command, a physical tool of the set of physical robots to manipulate the physical object;
updating the plurality of images and updating the volumetric data using an updated plurality of images and an updated volumetric data;
generating an updated 3D virtual reality environment using the updated plurality of images and the updated volumetric data; and
projecting, using the virtual reality projector, an animation of the object virtual representation and a virtual tool, within the 3D virtual reality environment from the point-of-view, wherein the animation corresponds to real physical movements of the physical tool and of the physical object.

* * * * *